(12) United States Patent
Liu et al.

(10) Patent No.: US 10,015,935 B2
(45) Date of Patent: Jul. 10, 2018

(54) METHOD OF REDUCING NITRATE CONTENT IN A PLANT

(71) Applicant: National Taiwan University, Taipei (TW)

(72) Inventors: Chi-Te Liu, Taipei (TW); Huu-Sheng Lur, Taipei (TW); Kai-Jiun Lo, Taipei (TW); Shu-Hua Hsu, Taipei (TW)

(73) Assignee: NATIONAL TAIWAN UNIVERSITY, Taipei (TW)

( * ) Notice: Subject to any disclaimer, the term of this patent is extended or adjusted under 35 U.S.C. 154(b) by 451 days.

(21) Appl. No.: 14/732,380

(22) Filed: Jun. 5, 2015

(65) Prior Publication Data

US 2016/0242362 A1  Aug. 25, 2016

(30) Foreign Application Priority Data

Feb. 24, 2015 (TW) .............................. 104105867 A (51) Int. Cl.
*A01G 22/00* (2018.01)
*A01G 31/00* (2018.01)
*A01G 7/00* (2006.01)

(52) U.S. Cl.
CPC ................ *A01G 22/00* (2018.02); *A01G 7/00* (2013.01); *A01G 31/00* (2013.01)

(58) Field of Classification Search
None
See application file for complete search history.

(56) References Cited

U.S. PATENT DOCUMENTS 9,175,258 B2 * 11/2015 Bywater-Ekegard .... C12N 1/12

FOREIGN PATENT DOCUMENTS

TW           I464260          12/2014

OTHER PUBLICATIONS

Wong et al. "Promoting Effects of a Single Rhodopseudomonas palustris Inoculant on Plant Growth by Brassica rapa chinensis under Low Fertilizer Input". Microbes Environ. vol. 29, No. 3, 303-313, 2014.*

Shu-Hwa Hsu et al, "利用光合菌微生物肥料降低水耕葉菜類中的硝酸鹽含量/Nitrate content in hydroponic lettuce reduced by phototrophic bacteria", Corp, Environment & Bioinformatics, vol. 12, Mar. 2015.

* cited by examiner

*Primary Examiner* — Vera Afremova
(74) *Attorney, Agent, or Firm* — WPAT, PC (57) ABSTRACT

The present invention provides a method of reducing nitrate content in a plant by supplementing *Rhodopseudomonas palustris* DSM 29314 with a hydroponic nutrient solution, wherein the plant can grow in the hydroponic nutrient solution. The bacteria can effectively reduce 50% to 88% of the nitrate content in the plant, and only requires half concentration of the hydroponic nutrient solution than usual to enhance the fresh and dry weight of the plant up to 17% to 44%. It can effectively reduce cost, increase income and provide safe crops.

16 Claims, 9 Drawing Sheets

METHOD OF REDUCING NITRATE CONTENT IN A PLANT

CROSS-REFERENCE TO RELATED APPLICATION

This application claims the priority of Taiwanese patent application No. 104105867, filed on Feb. 24, 2015, which is incorporated herewith by reference.

BACKGROUND OF THE INVENTION

1. Field of the Invention

The present invention relates generally to a novel use of *Rhodopseudomonas palustris* DSM 29314, and more particularly to reduce nitrate content in a plant.

2. The Prior Arts

For improving yield and quality of vegetables, fertilizer management is an inalienable part of agricultural cultivation, however, the excessive use of nitrogen-containing fertilizers or harvesting vegetables at low light intensity and during early morning all contribute to higher nitrate content in the vegetables. Although nitrate itself is harmless to human body, but it has been reported that about 5% of dietary nitrate is converted to a cancer-causing nitrite. Therefore, it needs to reduce the intake of nitrate for health consideration, in 1995, Food and Agriculture Organization/World Health Organization (FAO/WHO) Joint Expert Committee on Food Additives (JECFA) has recommended that acceptable per day daily intake (ADI) of nitrate do not exceed 3.7 mg nitrate ions per kilogram body weight. Vegetables represent the main source of human intake of nitrate, the maximum levels of nitrates in vegetables, such as spinach and lettuce, are provided by European Commission according to this recommendation in 1997 (<3000 ppm or [mg/Kg fresh weight]). Consumer awareness of food safety issues is high, providing the quality, safety and wholesomeness of crops is the responsibility of agricultural producers. Effectively reducing the residual nitrate content in the vegetables can not only ensure consumers to fell more at ease with eating, but also reducing the inappropriate use of chemical fertilizers minimizing the load on the environment.

In order to reduce the nitrate content in vegetables, soil cultivation can be improved by adding soil improvement materials and avoiding harvest early in the morning, besides reducing the amount of nitrogen-containing fertilizer and selecting low nitrate accumulation of vegetables. But it is difficult to transport the vegetables harvested at late afternoon or evening from farm field to market at the same day, which results in any additional costs incurred, such as overnight storage costs, and the appearance and quality of the crops are susceptible to be damaged. Also, under indoor artificial light, there are several ways to reduce nitrate content, including increasing light intensity, changing light source, modifying the composition of the hydroponic nutrient solution or interrupting the hydroponic nutrient solution, etc. In order not to affect yield, many general ways of reducing nitrate content are to analyze the components in soil or hydroponic nutrient solution prior to cultivation, and to determine the minimum amount of nitrogen-containing fertilizer demand, then to add the nitrogen fertilizer at appropriate time for planting, however, which tends to be more labor-intensive.

In recent years, microbe-related biotechnology has been used to solve some problems in agriculture and environment; those microorganisms are generally designated as plant-growth-promoting rhizobacteria (PGPR), and mainly applied in soil growing system. It is well-known that denitrifying or nitrate reducing bacteria can precede the reduction of nitrite to NO, $N_2O$ or $N_2$ through anaerobic respiration; however, there are numerous problems which the use of denitrifying bacteria for reducing nitrate content in agriculture can cause. These include: 1. generally, the denitrifying bacteria precedes the reduction of nitrate under anaerobic or microaerobic conditions, but plant growth is in sufficient oxygen environment; 2. the reduction of nitrate in the plant is to rely on the plant nitrate reductase, denitrifying bacteria must be endophyic bacteria; otherwise, the bacteria cannot directly precede the reduction of nitrate. People gradually demand for high quality, fresh, non-toxic and safe agriculture; therefore, it needs to provide a high quality and stability fertilizer for improving yield and quality of vegetables. That not only increases farmer's willingness to use, but also takes into account the yield and sustainable development of vegetables.

SUMMARY OF THE INVENTION

To solve the problem, the present invention provides a use of a phototrophic bacterium, *Rhodopseudomonas palustris* strain, which was deposited in the Deutsche Sammlung von Mikroorganismen und Zellkulturen GmbH (DSMZ) located at Inhoffenstr. 7B D-38124 Braunschweig with an accession number DSM 29314 on Aug. 27, 2014.

Nitrate is the main form for the plants absorbing nitrogen from fertilizer, the plants absorb nitrate to produce amino acids and protein for growth, however, the excessive use of nitrogen-containing fertilizer will cause high level of nitrate in crops to harm human health. Accordingly, one objective of the present invention is to provide a method of reducing nitrate content in a plant comprising supplementing an effective amount of *Rhodopseudomonas palustris* DSM 29314 with a hydroponic nutrient solution, wherein the effective amount is per milliliter hydroponic nutrient solution containing at least $10^3$ CFU *Rhodopseudomonas palustris* DSM 29314, and the plant grows in the hydroponic nutrient solution, such as *Brassica rapa* var. *chinensis* (Maruba Santoh and Cuiyu) and *Lactuca sativa* var. *crispa* (crinkle garden lettuce); the hydroponic nutrient solution is used in a plant factory.

According to an embodiment of the present invention, *Rhodopseudomonas palustris* DSM 29314 is further supplemented to reach per milliliter hydroponic nutrient solution containing $10^6$ CFU *Rhodopseudomonas palustris* DSM 29314 after a period time, and the period time is at least 7 days.

According to an embodiment of the present invention, a pH value of the hydroponic nutrient solution is 6.0 to 7.0.

Another objective of the present invention is to provide a low nitrate vegetable cultivation system, comprising: a nutrient supply and at least $10^3$ CFU/mL *Rhodopseudomonas palustris* DSM 29314.

According to an embodiment of the present invention, the nutrient supply is a hydroponic nutrient solution or fertilizer.

According to an embodiment of the present invention, a concentration of the hydroponic nutrient solution is down to half of a hydroponic nutrient solution without *Rhodopseudomonas palustris* DSM 29314.

According to an embodiment of the present invention, the nitrate content in the plant is reduced in the range of 50% to 88%.

According to an embodiment of the present invention, the fresh and dry weight of the plant is enhanced in the rage of 17% to 44%.

The present invention is to provide a method of reducing nitrate content in a plant by supplementing R. palustris DSM 29314 with a hydroponic nutrient solution, which not only effectively prevents nitrate accumulation in the crops of hydroponic cultivation without any changes in existing facilities, but also has the effect of only using half concentration of the hydroponic nutrient solution, increasing yield, saving cost and increasing revenue. Comparing with the usual cultivation, the method of the present invention can effectively reduce 50% to 88% of the nitrate content in the plant, for example, Maruba Santoh, *Brassica rapa* var. *chinensis* is cultivated in hydroponic nutrient solution containing R. palustris DSM 29314 can reduce up to 88% nitrate content, which is far lower the maximum level recommended by European Commission Regulation so as to provide a safe crop and improving yield and quality. Accordingly, the method of present invention can reduce nitrate content in crops, and has the advantage of improving the yield and quality of the crops, saving cost and time at the same time. Furthermore, effectively reducing the residual nitrate content in the crops can not only ensure consumers to fell more at ease with eating, but also reduce the inappropriate use of chemical fertilizers to minimize the load on the environment.

On the other hand, people usually put important on yield and nitrate content of the crops produced in the plant factory. In the past, many researchers have tried to modify the amount of light source, change the nutrient solution formulations, as well as change the facilities for increasing yield and reducing nitrate content. So far there is no research focused on using microbial liquid fertilizer to reduce nitrate content in the crops of hydroponic cultivation. Moreover, in the plant factory, the crops are produced in sterile environment to prevent the contamination of microbial pests or microorganisms. However, the present invention provides a method by supplementing phototrophic bacteria with a hydroponic cultivation system for increasing yield and reducing nitrate content, which has overcome a technical prejudice-related "dust-free sterile" in the plant factory.

BRIEF DESCRIPTION OF THE DRAWINGS

FIGS. 2A to 2C show the fresh and dry weights, and nitrate content of edible parts of Maruba Santoh treated with different bacterial inoculant. After cultivating for 17 days, FIG. 2C shows the nitrate content of edible parts. All values represents mean±SE at least 6 repeats. Different letters indicate a significant difference in the Least Significant Difference (L.S.D.) statistical analysis (P<0.05). 100% NS indicates the full strength hydroponic nutrient solution, 50% NS indicates the half strength hydroponic nutrient solution, +PS3 indicates treating *Rhodopseudomonas palustris* DSM 29314, and +BCRC 16408 indicates treating R. palustris BCRC $16408^T$.

FIGS. 4A to 4C show the fresh and dry weights, and nitrate content of edible parts of crinkle garden lettuce treated with different bacterial inoculant. After cultivating for 27 days, FIG. 4C shows the nitrate content of edible parts. All values represents mean±SE at least 8 repeats. Different letters indicate a significant difference in the L.S.D. statistical analysis (P<0.05). 100% NS indicates full strength hydroponic nutrient solution, 50% NS indicates half strength hydroponic nutrient solution, +PS3 indicates treating R. palustris DSM 29314, and +BCRC 16408 indicates treating R. palustris BCRC $16408^T$.

FIGS. 6A to 6C show the fresh and dry weights, and nitrate content of edible parts of Cuiyu treated with different bacterial inoculant. After cultivating for 17 days, FIG. 6C shows the nitrate content of edible parts. All values represents mean±SE at least 7 repeats. Different letters indicate a significant difference in the L.S.D. statistical analysis (P<0.05). 100% NS indicates the full strength hydroponic nutrient solution, +PS3 indicates treating R. palustris DSM 29314, +YSC3 indicates treating R. palustris NTUIOB-YSC3, and +BCRC 16408 indicates treating R. palustris BCRC $16408^T$.

FIGS. 7A to 7D show the yield and quality of Maruba Santoh cultivated in the soil containing R. palustris DSM 29314. FIG. 7D shows the agronomic nitrogen use efficiency (ANUE). All values represents mean±SE. Different letters indicate a significant difference in the L.S.D. statistical analysis (P<0.05). CF indicates chemical fertilizer, +PS3 indicates treating *Rhodopseudomonas palustris* DSM 29314.

FIGS. 8A and 8B show the yield and quality of Maruba Santoh cultivated in the soil containing different strain of R. palustris (R. palustris DSM 29314 and R. palustris NTUIOB-YSC3). FIG. 8B shows the nitrate content. All values represents mean±SE. Different letters indicate a significant difference in the L.S.D. statistical analysis (P<0.05). CF indicates chemical fertilizer, +PS3 indicates treating

*Rhodopseudomonas palustris* DSM 29314, and +YSC3 indicates treating *R. palustris* NTUIOB-YSC3.

DETAILED DESCRIPTION OF THE PREFERRED EMBODIMENT

The accompanying drawings are included to provide a further understanding of the invention, and are incorporated in and constitute a part of this specification. The drawings illustrate embodiments of the invention and, together with the description, serve to explain the principles of the invention.

The phototrophic purple non-sulfur bacteria of the present invention is *Rhodopseudomonas palustris* which was deposited in the Deutsche Sammlung von Mikroorganismen and Zellkulturen GmbH (DSMZ) located at Inhoffenstr. 7B D-38124 Braunschweig with an accession number DSM 29314 deposited on Aug. 27, 2014.

The present invention provides a novel use of *Rhodopseudomonas palustris* DSM 29314 (Taiwanese patent No. 1464260), which is a phototrophic purple non-sulfur bacteria isolated from paddy soils in northern Taiwan, it belongs to "safe microbial fertilizer bacteria" announced by R.O.C. Council of Agriculture. In addition to harmless to plants, the bacteria is also harmless to human body (Agriculture and Food No. 1001053407 announced by R.O.C. Council of Agriculture, 2011), it can metabolize different carbon sources, have a variety of extracellular enzymes activities (such as lipolytic enzymes, aminopeptidase and phosphatase, etc.) for carbon fixation and nitrogen fixation, have more resistance to high-salt environment, and secrete plant Auxin (such as indoleacetic acid, IAA). The inventors of the present invention have validated that the bacteria has excellent ability to promote crops growth by several crops growth experiments by applying the bacteria in dryland crops (such as cabbage, tomato and strawberry, etc.) and paddy crop (such as rice).

The above-mentioned phototrophic bacterium is also known as photosynthetic bacteria, which is a prokaryote having the original light synthesis system and quite widely distributed in nature. The phototrophic bacteria in different natural environments has many type of heterotrophic function (carbon fixation, nitrogen fixation and sulfide oxidation, etc.), and has a close relationship with nitrogen, phosphorus and sulfur cycle in the nature to play an important role in the self-purification process of the natural environment. Additionally, its secondary metabolites also have efficiency to inhibit pathogen, effectively remove some harmful substances such as hydrogen sulfide in the rice rhizosphere to reduce root rot incidence.

Definition

As used herein, "hydroponic crops" and "hydroponic vegetables" refer to that the plants cultivated in a hydroponic nutrient solution rather than soil, the plants are included but not limited to hydroponic crops or vegetables, mushrooms, flowers, succulent plants and hydroponic fruits (such as strawberry and tomato).

Example 1

Compare Maruba Santoh (*Brassica rapa* Var. *chinensis*) Cultivated in Hydroponic Nutrient Solution Containing a Different Inoculant in Plant Factory In recent years, in view of the natural affecting leafy vegetable growth factors, the plant factory or vegetable factory has been put into practice to produce crop by controlling all affecting growth factors, such as light, temperature, humidity and carbon dioxide content. In the present embodiment, a common hydroponic lettuce such as Maruba Santoh (*Brassica rapa* var. *chinensis*) in the plant factory is used as experimental material. *R. palustris* DSM 29314 or *R. palustris* BCRC 16408$^T$ used for comparison is supplemented with the usual the full strength hydroponic nutrient solution or the half strength hydroponic nutrient solution to estimate the influence of the microbial fertilizer on yield and nitrate content in leafy vegetable.

1.1 Prepare the Bacterial Inoculant

In the present embodiment, *R. palustris* DSM 29314 (labeled as PS3) is used, and *R. palustris* BCRC 16408$^T$ (labeled as BCRC16408) is used for comparison.

First, pick a single bacteria colony from the phototrophic bacteria culture to 3 mL purple nonsulfur bacteria (PNSB) medium, and incubate the bacteria at 37° C. at 200 rpm for 24 hour. Then, transfer the bacteria into 250 mL conical flask containing 50 mL PNSB medium and incubate until $OD_{600}$ up to 1.0 (is equivalent to $10^9$ CFU (colony forming unit)/mL of bacteria). Finally, dilute the incubated bacteria with fresh PNSB medium to $OD_{600}$ of 0.1 (is equivalent to $10^8$ CFU/mL of bacteria).

1.2 Prepare the Hydroponic Nutrient Solution in a Plant Factory

The concentration of the usual hydroponic nutrient solution is labeled as 100% NS, comprising: $KNO_3$, $MgSO_4 \cdot 7H_2O$, $KH_2PO_4$, Fe-EDTA, $H_3BO_3$, $CuSO_4$, $ZnSO_4 \cdot 7H_2O$, $MnCl_2 \cdot 4H_2O$, $Na_2MoO_4 \cdot 2H_2O$ and $Ca(NO_3)_2 \cdot 4H_2O$ and other ingredients (the element's content is as follow: 210 ppm N, 235 ppm K, 200 ppm Ca, 31 ppm P, 64 ppm S, 48 ppm Mg, 0.5 ppm B, 5 ppm Fe, 0.5 ppm Mn, 0.05 ppm Zn, 0.02 ppm Cu and 0.01 ppm Mo). The concentration of the hydroponic nutrient solution is measured by electrical conductivity meter (EC meter) (Catalog #2265FS, SPECTRUM® TECHNOLOGIES, INC) and adjusted with concentrated hydroponic nutrient solution to maintain EC value of approximately 1.8 mS/cm. pH value is measured by pH meter and maintained at 6.0 to 7.0. EC value and pH value are adjusted once every three days. The half strength hydroponic nutrient solution (labeled as 50% NS) is adjusted from the full strength hydroponic nutrient solution (labeled as 100% NS) to half (EC value is 1.2 mS/cm), and pH value is 6.0 to 7.0. Cultivation environment is to set at 25° C. day and night temperature, 50% to 70% humidity, 210 µmol.m$^{-2}$.s$^{-1}$ light intensity for 12 hour.

1.3 Hydroponic Cultivation in Plant Factory

Maruba Santoh seedlings with fully expanded primary leaves transfer to a container having 100% NS or 50% NS hydroponic nutrient solution (35 L, 24 seedlings in each cultivation tank) and confirm the root completely covered with the hydroponic nutrient solution. The above-mentioned PS3 or BCRC 16408 is supplemented with the hydroponic nutrient solution in the container and the final concentration of PS3 or BCRC 16408 is $10^3$-$10^7$ CFU/mL. The aeration pump is used to increase the dissolved oxygen level in the hydroponic nutrient solution and to make a uniform distribution of the bacteria. EC value and pH value are adjusted once every three days, 250 mL PS3 or BCRC 16408 ($10^8$ CFU/mL) is supplemented with the hydroponic nutrient solution every week to reach per milliliter hydroponic nutrient solution containing $10^6$ CFU of bacteria. Maruba Santoh is harvested at $17^{th}$ day to investigate the agronomic traits and measure the nitrate content.

Figure 1:
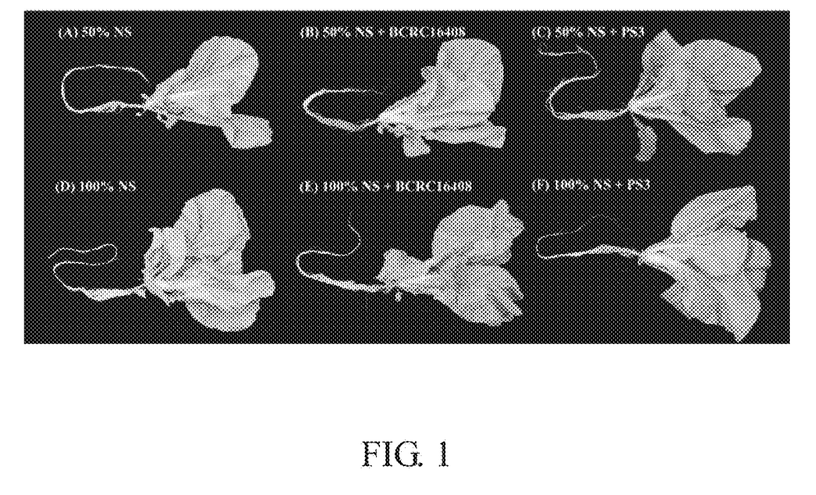
FIG. 1 shows the appearance of Maruba Santoh (*Brassica rapa* var. *chinensis*) cultivated in the hydroponic nutrient solution in plant factory, (A) Maruba Santoh cultivated in 50% the hydroponic nutrient solution; (B) Maruba Santoh cultivated in 50% the hydroponic nutrient solution containing BCRC 16408 microbial liquid; (C) Maruba Santoh cultivated in 50% the hydroponic nutrient solution containing PS3 microbial liquid; (D) Maruba Santoh cultivated in 100% the hydroponic nutrient solution; (E) Maruba Santoh cultivated in 100% the hydroponic nutrient solution containing BCRC 16408 microbial liquid; and (F) Maruba Santoh cultivated in 100% the hydroponic nutrient solution containing PS3 microbial liquid.

As shown in FIG. 1 and FIGS. 2A to C, the hydroponic nutrient solution containing PS3 or BCRC 16408 does not affect the appearance of Maruba Santoh (FIG. 1). Comparing the fresh and dry weights of aerial part of plant (edible parts) in each treatment, the full strength hydroponic nutrient solution (100% NS) containing PS3 phototrophic bacteria does not affect Maruba Santoh yield (FIGS. 2A and B), and that containing BCRC 16408 phototrophic bacteria grows dry weight loss of Maruba Santoh. The half strength hydroponic nutrient solution (50% NS) containing PS3 can significantly improve Maruba Santoh growth, even though the fresh and dry weights of Maruba Santoh (50% NS+PS3) fail to reach those values of Maruba Santoh cultivated in the full strength hydroponic nutrient solution (100% NS), but it still increases 21% in fresh weight (FIG. 2A) and 40% in dry weight (FIG. 2B) than Maruba Santoh only cultivated by the half strength hydroponic nutrient solution (50% NS) without inoculant. However, the hydroponic nutrient solution containing BCRC 16408 does not improve the growth of Maruba Santoh.

Figure 2A:
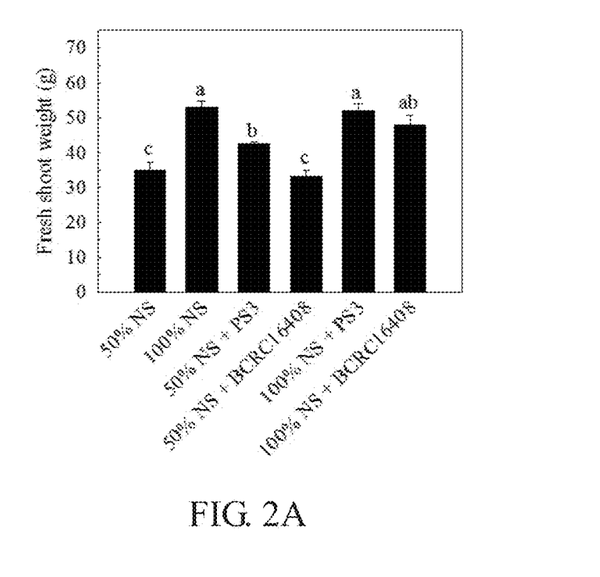
FIG. 2A shows the fresh weight of aerial part of plant.
Figure 2B:
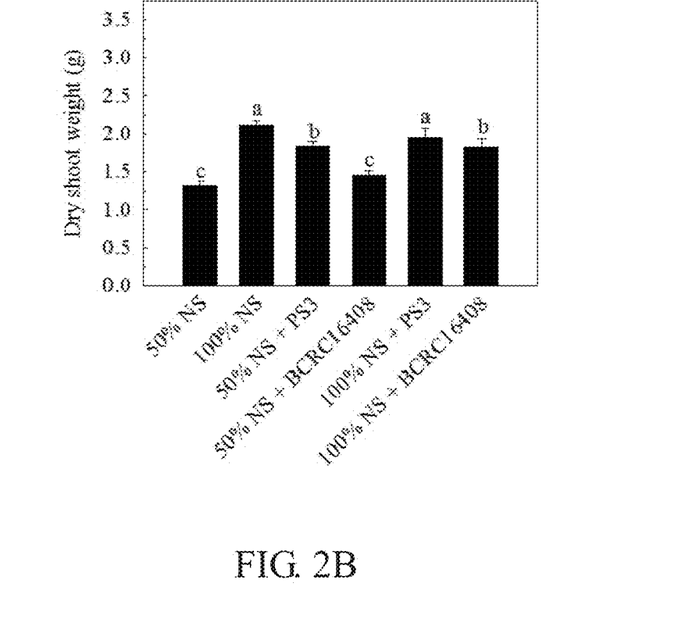
FIG. 2B shows the dry weight of aerial part of plant.

The nitrate content of the edible parts of Maruba Santoh cultivated in the full strength hydroponic nutrient solution is approximately 4161±121 mg kg$^{-1}$ (ppm), which is slightly higher than 4,000 ppm the maximum levels of European Commission Regulation (EC). It is well known that an effective way reducing nitrate content in vegetables is to reduce the amount of nitrogen fertilizer during cultivation. In the present embodiment, The nitrate content in the edible parts of Maruba Santoh cultivated in the half strength hydroponic nutrient solution (50% NS) is 1010±210 mg kg$^{-1}$ (FIG. 2C), but the yield of Maruba Santoh is lower than the full strength hydroponic nutrient solution (100% NS) (FIGS. 2A and B). However, PS3 phototrophic bacteria not only significantly reduced nitrate content (down to 1619±176 mg kg$^{-1}$, a decrease of about 61%) but also sustained yield of Maruba Santoh under the full strength hydroponic nutrient solution.

Figure 2C:
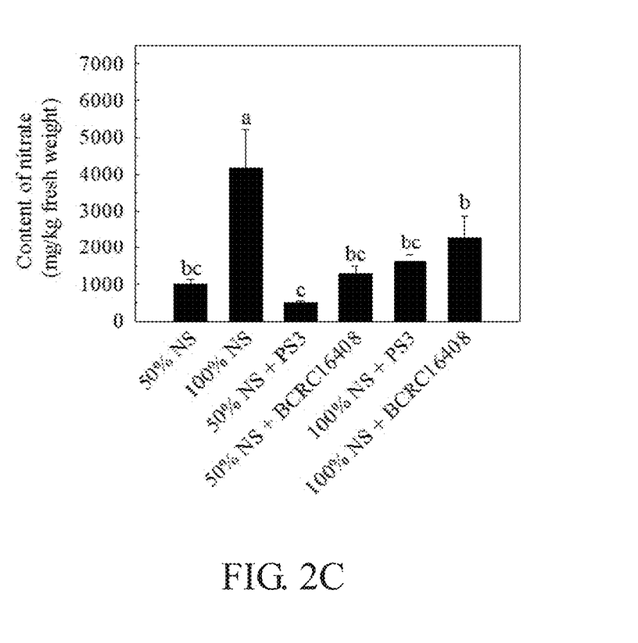

The nitrate content in the edible parts of Maruba Santoh cultivated in the half strength hydroponic nutrient solution (50% NS) is less (1010±210 mg kg$^{-1}$). Farther adding PS3 phototrophic bacteria in the hydroponic nutrient solution, the yield is increased (FIGS. 2A and B), but the nitrate content is decreased 88% than the 100% NS treatment (down to 496±46 mg kg$^{-1}$) (FIG. 2C). $R.$ $palustris$ BCRC 16408$^T$ as the comparing treatment does not show such a great result, which confirms that not all phototrophic bacterium have the effect of maintaining yield and reducing nitrate content, as well as the $R.$ $palustris$ DSM 29314.

Example 2

Compare Crinkle Garden Lettuce (*Lactuca sativa* Var. *crispa*) Cultivated in the Hydroponic Nutrient Solution Containing a Different Inoculant in Plant Factory In the present embodiment, another common hydroponic lettuce such as crinkle garden lettuce (*Lactuca sativa* var. *crispa*) in the plant factory is used as experimental material. $R.$ $palustris$ DSM 29314 or $R.$ $palustris$ BCRC 16408$^T$ used for comparison is supplemented with the usual full strength hydroponic nutrient solution or the half strength hydroponic nutrient solution to evaluate the influence of the microbial fertilizer on yield and nitrate content in the crinkle garden lettuce.

2.1 Prepare the Bacterial Inoculant

In the present embodiment, $R.$ $palustris$ DSM 29314 (labeled as PS3) is used, and $R.$ $palustris$ BCRC 16408$^T$ (labeled as BCRC16408) is used for comparison.

First, pick a single bacteria colony from the phototrophic bacteria culture to 3 mL purple nonsulfur bacteria (PNSB) medium, and incubate the bacteria at 37° C. at 200 rpm for 24 hour. Then, transfer the bacteria into 250 mL conical flask containing 50 mL PNSB medium and incubate until $OD_{600}$ up to 1.0 (is equivalent to $10^9$ CFU/mL of bacteria). Finally, dilute the incubated bacteria with fresh PNSB medium to $OD_{600}$ of 0.1 (is equivalent to $10^8$ CFU/mL of bacteria).

2.2 Hydroponic Cultivation in Plant Factory

The preparation of the hydroponic nutrient solution and cultivation environment are the same as EXAMPLE 1. Crinkle garden lettuce seedlings with fully expanded primary leaves transfer to a container having 100% NS or 50% NS hydroponic nutrient solution (35 L, 24 seedlings in each cultivation tank) and confirm the root completely covered with the hydroponic nutrient solution. The above-mentioned PS3 or BCRC 16408 is supplemented with the hydroponic nutrient solution in the container and the final concentration of PS3 or BCRC 16408 is $10^3$-$10^7$ CFU/mL. The aeration pump is used to increase the dissolved oxygen level in the hydroponic nutrient solution and to make a uniform distribution of the bacteria. EC value and pH value are adjusted once every three days, 240 mL PS3 or BCRC 16408 ($10^8$ CFU/mL) is supplemented with the hydroponic nutrient solution every week, 14$^{th}$ and 21$^{th}$ day to reach per milliliter hydroponic nutrient solution containing $10^6$ CFU of bacteria. Maruba Santoh is harvested at 27$^{th}$ day to investigate the agronomic traits and measure the nitrate content.

Figure 3:
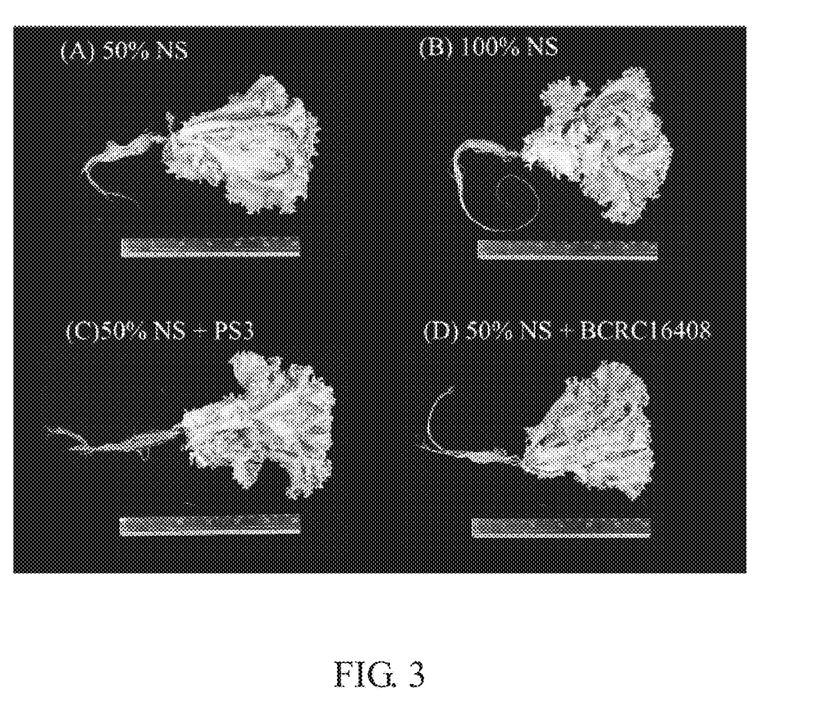
FIG. 3 shows the appearance of crinkle garden lettuce (*Lactuca sativa* var. *crispa*) cultivated in the hydroponic nutrient solution in the plant factory; (A) crinkle garden lettuce cultivated in 50% the hydroponic nutrient solution; (B) crinkle garden lettuce cultivated in 100% the hydroponic nutrient solution; (C) crinkle garden lettuce cultivated in 50% the hydroponic nutrient solution containing PS3 microbial liquid; (D) crinkle garden lettuce cultivated in 50% the hydroponic nutrient solution containing BCRC 16408 microbial liquid.
Figure 4A:
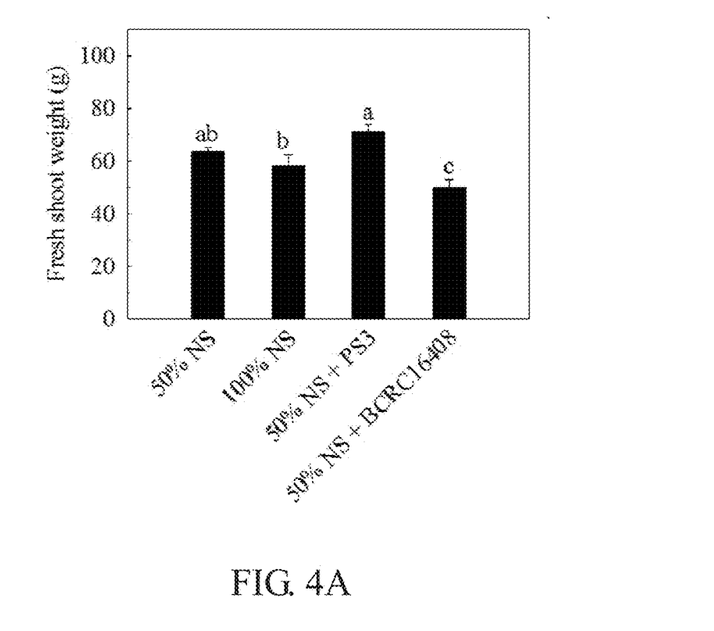
FIG. 4A shows the fresh weight of aerial part of plant.
Figure 4B:
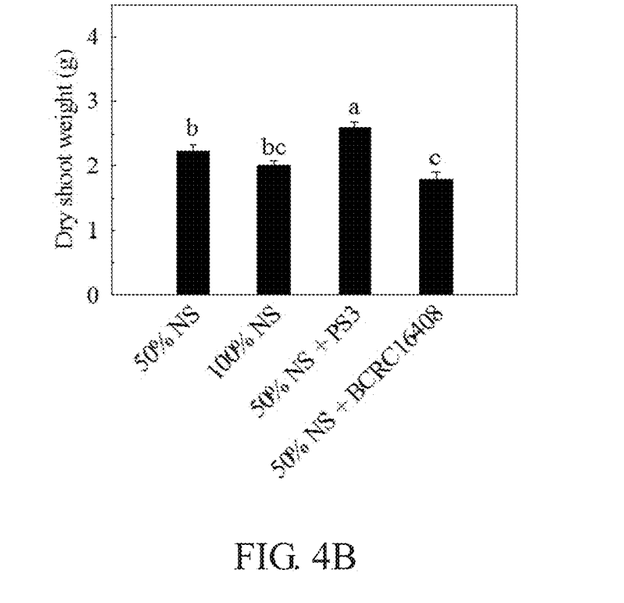
FIG. 4B shows the dry weight of aerial part of plant.

As shown in FIG. 3 and FIGS. 4A to C, the hydroponic nutrient solution containing PS3 or BCRC 16408 does not affect the appearance of crinkle garden lettuce (FIG. 3). The fresh and dry weights of crinkle garden lettuce cultivated in full strength hydroponic nutrient solution (100% NS) are not higher than that cultivated in half strength hydroponic nutrient solution (50% NS), which show that the half strength hydroponic nutrient solution is enough for crinkle garden lettuce growing. The half strength hydroponic nutrient solution containing PS3 phototrophic bacteria improve the growth of crinkle garden lettuce. Comparing with 50% NS treatment, the fresh and dry weights of the edible parts are increased 12% (FIG. 4A) and 17% (FIG. 4B) in 50% NS+PS3, respectively. However, the fresh and dry weights of crinkle garden lettuce are decreased in the hydroponic nutrient solution containing BCRC 16408 (FIGS. 4A and B).

Figure 4C:
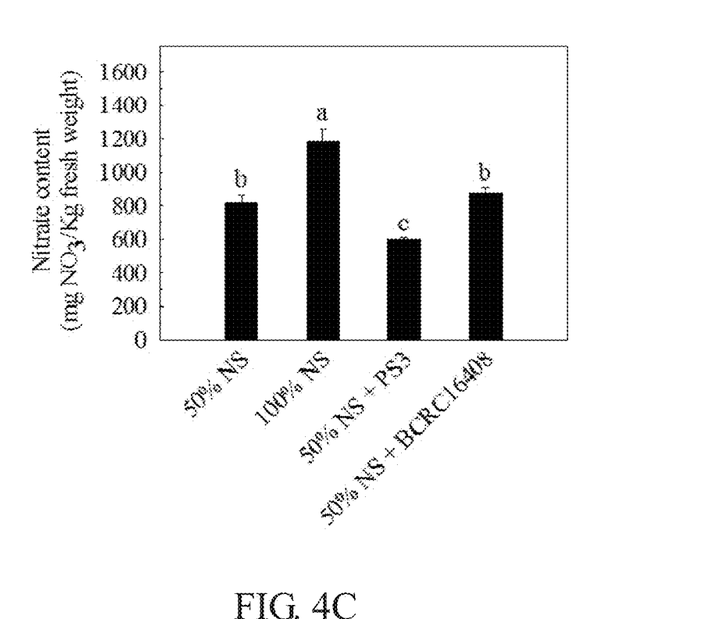

The nitrate content in the edible parts of Crinkle garden lettuce cultivated under the half strength hydroponic nutrient solution (50% NS) is significantly decreased (818±47 mg kg$^{-1}$) than 100% NS treatment (1186±75 mg kg$^{-1}$) (FIG. 4C). Same as the result shown in EXAMPLE 1, the half strength hydroponic nutrient solution (50% NS) containing PS3 phototrophic bacteria reduce the nitrate content of Crinkle garden lettuce (down to 601±9 mg kg$^{-1}$, which is decreased 49% than the 100% NS treatment) (FIG. 4C). BCRC 16408 treatment does not have the same effect, which verifies that not all phototrophic bacterium can have the effect of maintaining yield and reducing nitrate content, as well as the $R.$ $palustris$ DSM 29314 shows. Moreover, the effect of $R.$ $palustris$ DSM 29314 on the yield and nitrate content is not limited to *Brassica rapa* var. *chinensis*. It also affects the growth and nitrate accumulation in *Lactuca sativa* var. *crispa* significantly.

Example 3

Compare the Cuiyu (*Brassica rapa* Var. *chinensis*) Cultivated in the Hydroponic Nutrient Solution Containing a Different Inoculant in Plant Factory In the present embodiment, another common *Brassica rapa* var. *chinensis* hydroponic lettuce, Cuiyu in the plant factory is used as experimental material. R. palustris DSM 29314, R. palustris NTUIOB-YSC3 isolated from paddy soil in Yilan Taiwan, or R. palustris BCRC 16408$^T$ used for comparison is supplemented with the usual full strength hydroponic nutrient solution or half strength hydroponic nutrient solution to estimate the influence of the microbial fertilizer on yield and nitrate content in the leafy vegetable.

3.1 Prepare the Bacterial Inoculant

In the present embodiment, R. palustris DSM 29314 (labeled as PS3) is used, R. palustris NTUIOB-YSC3 (labeled as YSC3) and R. palustris BCRC 16408$^T$ (labeled as BCRC 16408) are used for comparison.

First, pick a single bacteria colony from the phototrophic bacteria culture to 3 mL purple nonsulfur bacteria (PNSB) medium, and incubate the bacteria at 37° C. at 200 rpm for 24 hour. Then, transfer the bacteria into 250 mL conical flask containing 50 mL PNSB medium and incubate until $OD_{600}$ up to 1.0 (is equivalent to $10^9$ CFU/mL of bacteria). Finally, dilute the incubated bacteria with fresh PNSB medium to $OD_{600}$ of 0.1 (is equivalent to $10^8$ CFU/mL of bacteria).

3.2 Hydroponic Cultivation in Plant Factory

The preparation of the hydroponic nutrient solution and cultivation environment are the same as EXAMPLE 1. Cuiyu seedlings with fully expanded primary leaves transfer to a container having 100% NS (35 L, 24 seedlings in each cultivation tank) and confirm the root completely covered with the hydroponic nutrient solution. The above-mentioned PS3, YSC3 or BCRC 16408 is supplemented with the hydroponic nutrient solution in the container and the final concentration is $10^3$-$10^7$ CFU/mL. The aeration pump is used to increase the dissolved oxygen level in the hydroponic nutrient solution and to make a uniform distribution of the bacteria. EC value and pH value are adjusted once every three days, 240 mL PS3, YSC3 or BCRC 16408 ($10^8$ CFU/mL) is supplemented with the hydroponic nutrient solution again at $7^{th}$ to reach per milliliter hydroponic nutrient solution containing $10^6$ CFU of bacteria. Cuiyu is harvested at $17^{th}$ day to investigate the agronomic traits and measure the nitrate content.

Figure 5:
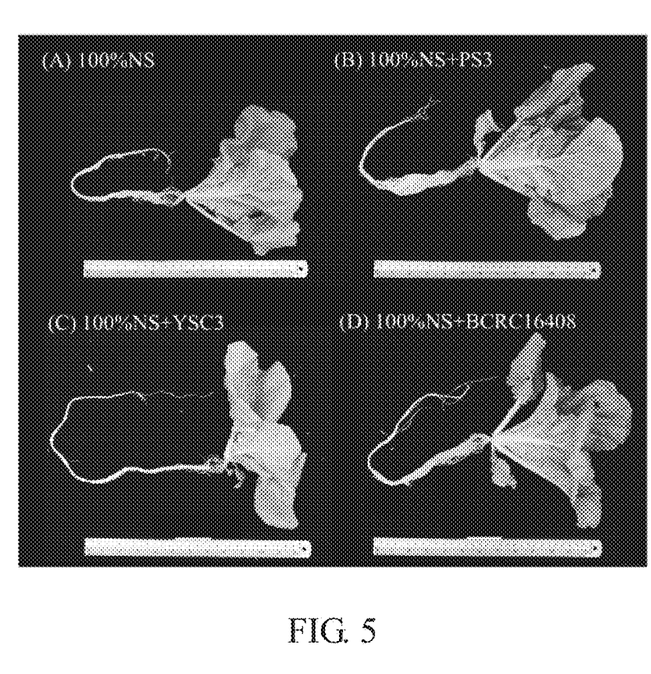
FIG. 5 shows the appearance of Cuiyu (*Brassica rapa* var. *chinensis*) cultivated in the hydroponic nutrient solution in plant factory, (A) Cuiyu cultivated in the full strength hydroponic nutrient solution (100% NS); (B) Cuiyu cultivated in the full strength hydroponic nutrient solution containing PS3 microbial liquid; (C) Cuiyu cultivated in the full strength the hydroponic nutrient solution containing R. palustris NTUIOB-YSC3 microbial liquid, (D) Cuiyu cultivated in the full strength hydroponic nutrient solution containing BCRC 16408 microbial liquid.

As shown in FIG. 5 and FIGS. 6A to C, the full strength hydroponic nutrient solution containing a different inoculant does not affect the appearance of Cuiyu (FIG. 5). Comparing the fresh and dry weights of aerial part of plant (edible parts) in each treatment, the full strength hydroponic nutrient solution (100% NS) containing PS3 or BCRC 16408 phototrophic bacteria can significantly improve the fresh and dry weights of Cuiyu. However, in the same hydroponic nutrient solution containing YSC3 does not significantly promote the growth of Cuiyu (FIGS. 6A and B), which suggested that not all Rhodopseudomonas palustris possess the ability of plant-growth promoting.

Figure 6A:
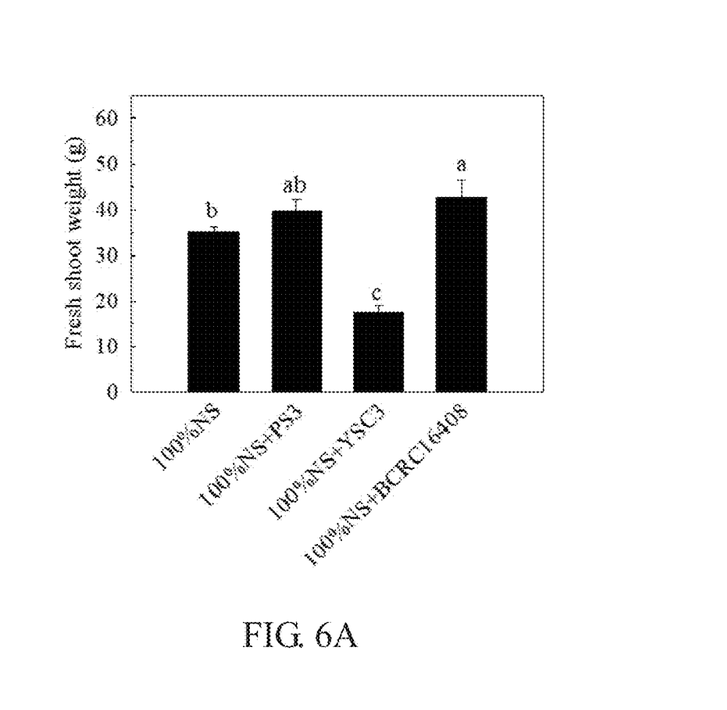
FIG. 6A shows the fresh weight of aerial part of plant.
Figure 6B:
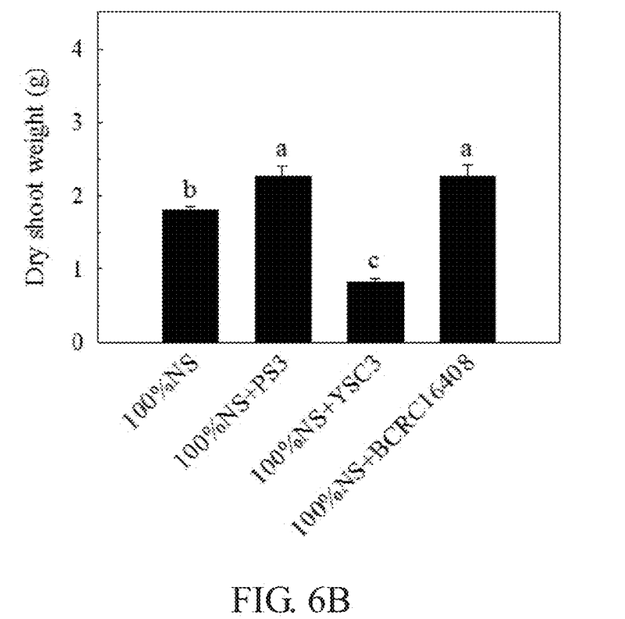
FIG. 6B shows the dry weight of aerial part of plant.
Figure 6C:
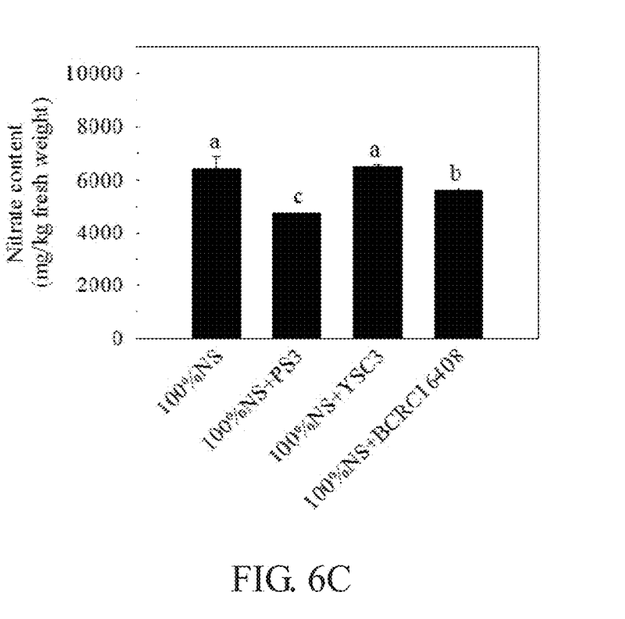

In FIG. 6C, the nitrate content of the edible parts of Cuiyu cultivated in full strength hydroponic nutrient solution (100% NS) is 6297±392 mg kg$^{-1}$. Under the 100% NS, containing PS3 and BCRC 16408 inoculations lowered the nitrate content of Cuiyu significantly (4746.7 mg kg$^{-1}$ and 5604 mg kg$^{-1}$, respectively). On the other hand, the nitrate content of Cuiyu has not been changed by YSC3 inoculation, which also shows that not all Rhodopseudomonas palustris have the effect of reducing nitrate content.

Example 4

The Maruba Santoh (Brassica rapa Var. chinensis) Cultivated in Soil Cultivation Test In the present embodiment, Maruba Santoh is in soil cultivation in greenhouse, R. palustris DSM 29314 as a microbial liquid fertilizer is supplemented with soil to estimate the influence of the microbial fertilizer on yield and nitrate content in leafy vegetable.

4.1 Prepare the Bacterial Inoculant

In the present embodiment, R. palustris DSM 29314 (labeled as PS3) is used, First, pick a single bacteria colony from the phototrophic bacteria culture to 3 mL purple nonsulfur bacteria (PNSB) medium, and shake the bacteria in culture shock until $OD_{600}$ up to 0.2 (is equivalent to $2\times10^8$ CFU/mL of bacteria). Then, transfer the bacteria into 250 mL conical flask containing 50 mL PNSB medium and incubate until $OD_{600}$ up to 1.0 (is equivalent to $10^9$ CFU/mL of bacteria). Finally, dilute the incubated bacteria with fresh PNSB medium to $OD_{600}$ of 0.1 (is equivalent to $10^8$ CFU/mL of bacteria).

4.2 Soil Cultivation

Maruba Santoh with fully expanded primary leaves is cultivated in 3-inch pot with commercial chemical fertilizer flower princess No. 2 (fertilizer NO. 0093062, SINON CORPORATION) containing 14% total nitrogen content having 14% ammonium nitrogen, and 15% phosphoric anhydride soluble in citric acid having 13.5% water soluble phosphorus anhydride. The present invention provides four treatments: control treatment (without chemical fertilizer, labeled as 0% CF), half amount of chemical fertilizer (50% chemical fertilizer, labeled as 50% CF), whole amount of chemical fertilizer (100% chemical fertilizer, labeled as 100% CF) and half amount of chemical fertilizer containing PS3 microbial fertilizer bacteria (per gram of soil inoculating $10^3$-$10^7$ CFU of bacteria on average, labeled as 50% CF+PS3). The whole amount of chemical fertilizer is according to crop fertilization guide, the application amount of 100% chemical fertilizer is 0.1 g/pot, the application amount of 50% chemical fertilizer is 0.05 g/pot, and the soil in each pot is 300 g. The pot cultivation is adopted radon sampling design, each treatment repeats 20 times. Cultivation environment is to set at 25° C. day temperature, 20° C. night temperature, natural light and 80% humidity. The edible parts of Maruba Santoh are harvested to measure the fresh weight after cultivation for 30 days, and measure the dry weight after drying at 80° C. The edible parts of Maruba Santoh are used to measure the nitrate content. The edible parts are ground into juice in a juicer to measure the nitrate content by using reflectometer (RQflex®10 plus, MERCK), the value is converted to the nitrate content containing in per gram of Maruba Santoh. The present invention also uses the method proposed by Ladha et al. (Ladha et al. 2005) to calculate agronomic nitrogen use efficiency (ANUE) by inputs of nitrogen fertilizer and yield (dry weight).

Figure 7A:
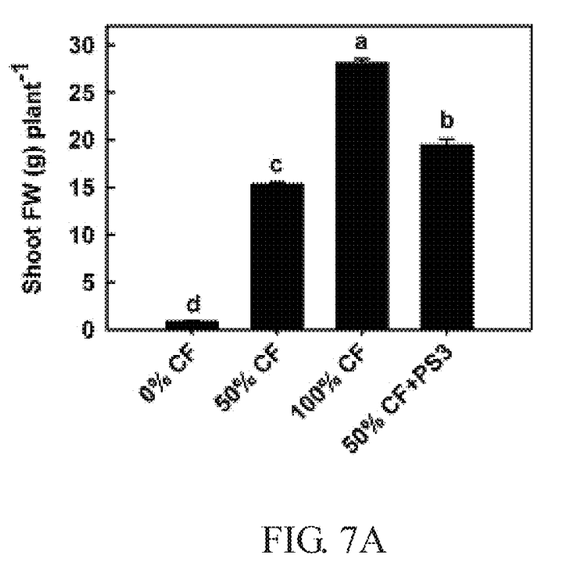
FIG. 7A shows the fresh weight of aerial part of plant.
Figure 7B:
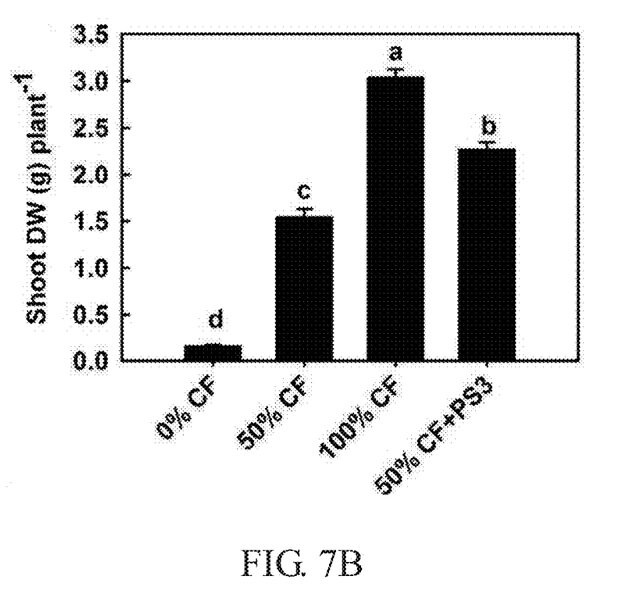
FIG. 7B shows the dry weight of aerial part of plant.
Figure 7C:
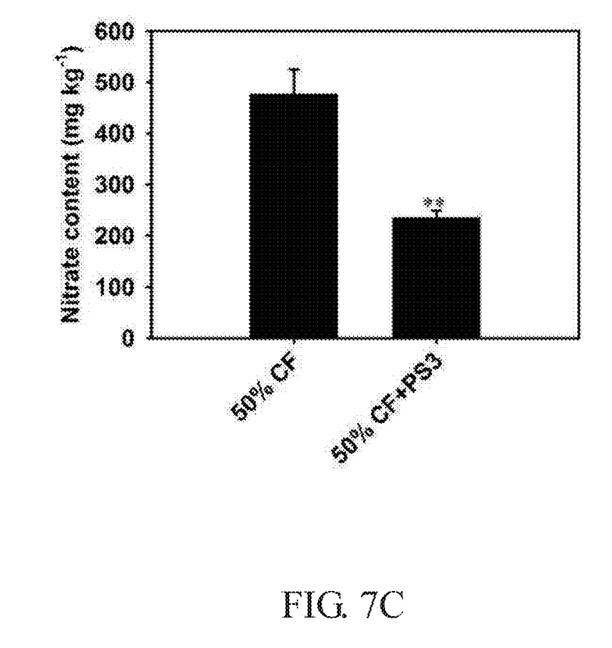
FIG. 7C shows the nitrate content of edible parts.
Figure 7D:
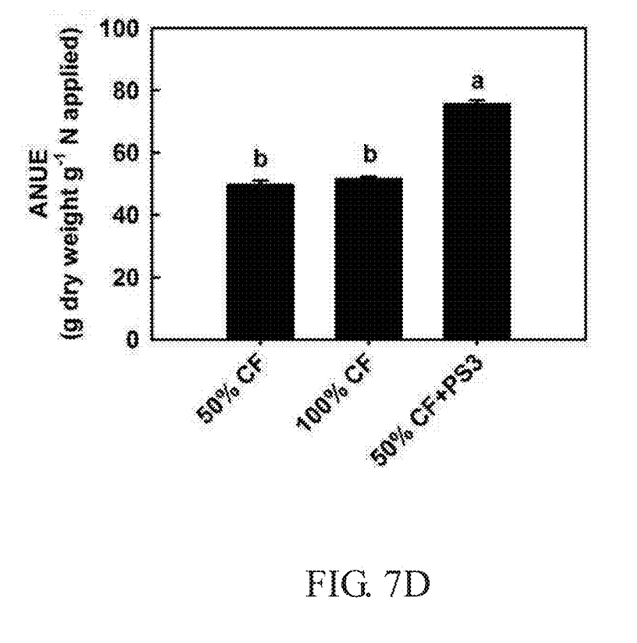

As shown in FIGS. 7A to D, in FIGS. 7A and B, Maruba Santoh cultivated in the half amount of the chemical fertilizer containing PS3 (50% CF+PS3) shows either fresh weight or dry weight significantly higher than the half amount of the chemical fertilizer (50% CF). In FIG. 7C, the nitrate content of Maruba Santoh cultivated in the half amount of the chemical fertilizer containing PS3 (50% CF+PS3) is decreased 51%. Additionally, in FIG. 7D, the 50% CF+PS3 treatment shows high agronomic nitrogen use efficiency (ANUE=75.6±1.3). The above results show that PS3 phototrophic bacteria fertilizer can be used to decrease the amount of chemical fertilizer by up to 50%, to improve the plant's nitrogen metabolism or agronomic nitrogen use efficiency in crops, and to effectively reduce nitrate accumulation in leafy vegetable.

Example 5

Compare Maruba Santoh (*Brassica rapa* Var. *chinensis*) Cultivated in Soil Cultivation Containing a Different Inoculant In the present embodiment, Maruba Santoh (*Brassica rapa* var. *chinensis*) is used as soil cultivation experimental material. *R. palustris* DSM 29314, or *R. palustris* NTUIOB-YSC3 isolated from paddy soil in Yilan Taiwan used as microbial liquid fertilizer is supplemented with soil to estimate the influence of the microbial fertilizer on yield and nitrate content in the leafy vegetable.

5.1 Prepare the Bacterial Inoculant

In the present embodiment, *R. palustris* DSM 29314 (labeled as PS3) is used, *R. palustris* NTUIOB-YSC3 (labeled as YSC3) is used for comparison. First, pick a single bacteria colony from the phototrophic bacteria culture to 3 mL purple nonsulfur bacteria (PNSB) medium, and shake the bacteria in culture shock until $OD_{600}$ up to 0.2 (is equivalent to $2\times10^8$ CFU/mL of bacteria). Then, transfer the bacteria into 250 mL conical flask containing 50 mL PNSB medium and incubate until $OD_{600}$ up to 1.0 (is equivalent to $10^9$ CFU/mL of bacteria). Finally, dilute the incubated bacteria with fresh PNSB medium to $OD_{600}$ of 0.1 (is equivalent to $10^8$ CFU/mL of bacteria).

5.2 Soil Cultivation

Maruba Santoh with fully expanded primary leaves is cultivated in 3-inch pot with commercial chemical fertilizer flower princess NO. 2 (fertilizer No. 0093062, SINON CORPORATION) containing 14% total nitrogen content having 14% ammonium nitrogen, and 15% phosphoric anhydride soluble in citric acid having 13.5% water soluble phosphorus anhydride. The present invention provides four treatments: control treatment is half amount of chemical fertilizer (50% chemical fertilizer, labeled as 50% CF) and the half amount of chemical fertilizer containing PS3 microbial fertilizer bacteria (per gram of soil containing $10^3$-$10^7$ CFU of bacteria, labeled as 50% CF+PS3). The whole amount of chemical fertilizer is according to crop fertilization guide, the application amount of 50% chemical fertilizer is 0.05 g/pot, and the soil in each pot is 300 g. The pot cultivation is adopted radon sampling design, each treatment repeats 20 times. Cultivation environment is to set at 25° C. day temperature, 20° C. night temperature, natural light and 80% humidity. The edible parts of Maruba Santoh are harvested to measure the fresh weight after cultivation for 30 days, and measure the dry weight after drying at 80° C. The edible parts of Maruba Santoh are used to measure the nitrate content. The edible parts is ground into juice in a juicer to measure the nitrate content by using reflectometer (RQflex®10 plus, MERCK), the value is converted to the nitrate content containing in per gram of Maruba Santoh. The present invention also uses the method proposed by Ladha et al. (Ladha et al. 2005) to calculate agronomic nitrogen use efficiency (ANUE) by inputs of nitrogen fertilizer and yield (dry weight).

Figure 8A:
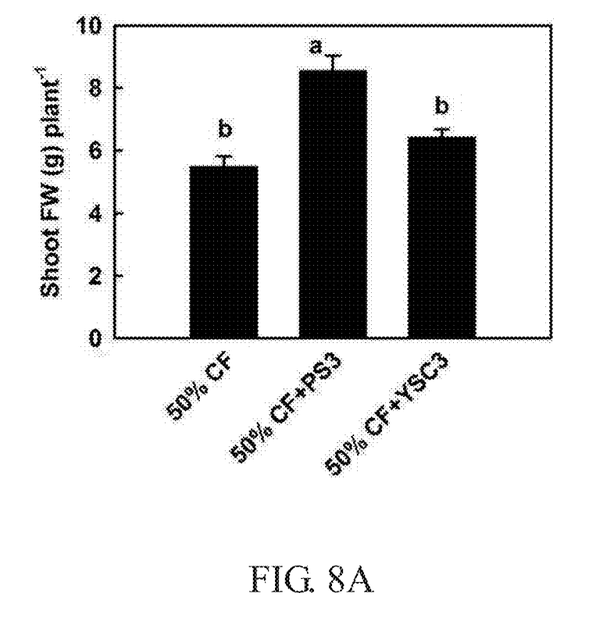
FIG. 8A shows the fresh weight of aerial part of plant.
Figure 8B:
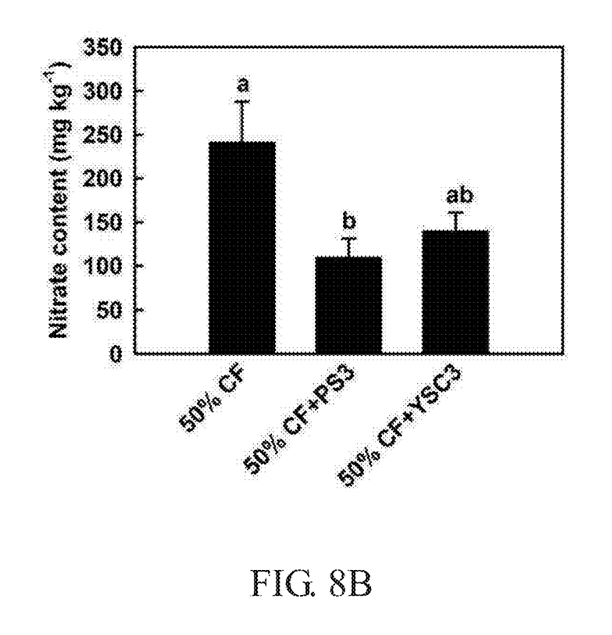

As shown in FIGS. 8A to B, in FIG. 8A, Maruba Santoh cultivated in the half amount of the chemical fertilizer containing PS3 (50% CF+PS3) shows PS3 microbial liquid fertilizer can promote Maruba Santoh growth, but YSC3 microbial liquid fertilizer does not have the same effect. Moreover, comparing the nitrate accumulation in leafy vegetable in each treatment (FIG. 8B), the nitrate content of Maruba Santoh cultivated under half amount of chemical fertilizer containing PS3 (50% CF+PS3) is decreased 55% than half amount of chemical fertilizer treatment (50% CF). Although the nitrate content in Maruba Santoh is also decreased 42% by another phototrophic bacteria strain YSC3 inoculant. The effect of reducing nitrate content in YSC3 treatment in soil cultivation is still less than that of PS3 treatment. However, the effect of reducing nitrate content in YSC3 treatment in hydroponic system of plant factory does not show the same result, which suggests that phototrophic bacteria have different effects on nitrate content of vegetable in hydroponic and soil cultivation.

In summary, the present invention uses *R. palustris* DSM 29314 to conduct several growth experiments in soil and hydroponic cultivation systems for different crop, which validates that the bacteria can promote yield of *Brassica rapa* var. *chinensis* (Maruba Santoh and Cuiyu) and *Lactuca sativa* var. *crispa* (crinkle garden lettuce), most importantly, it reduce the nitrate content in leafy vegetable to prevent human body from a high nitrate intake. On the other hand, not all phototrophic bacteria show the same effect of reducing nitrate content in both hydroponic and soil cultivation. *R. palustris* DSM 29314 of the present invention can not only be applied in plant factory, but also enhance the yield and safety in hydroponic vegetable to develop a new technology.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A method of reducing nitrate content in a plant comprising:
   supplementing *Rhodopseudomonas palustris* DSM 29314 into a hydroponic nutrient solution to a concentration of at least 10,000 colony forming units (CFU) per milliliter; and thereafter
   hydroponically growing said plant in the hydroponic nutrient solution.

2. The method according to claim 1, wherein said plant is grown in a plant factory.

3. The method according to claim 1, further comprising supplementing additional *Rhodopseudomonas palustris* DSM 29314 to reach a million CFU per milliliter in said hydroponic nutrient solution after a period time.

4. The method according to claim 3, wherein the period time is at least 7 days.

5. The method according to claim 1, wherein a pH value of the hydroponic nutrient solution is 6.0 to 7.0.

6. The method according to claim 1, further comprising a step of diluting the hydroponic nutrient solution by half prior to said supplementing step.

7. The method according to claim 1, wherein the nitrate content in the plant is reduced in the range of 50% to 88%.

8. The method according to claim 1, wherein a fresh and dry weight of the plant is enhanced in the range of 17% to 44%.

9. The method according to claim 1, wherein the plant is Maruba Santoh, Cuiyu, *Brassica rapa* var. *chinensis* crinkle garden lettuce, or *Lactuca sativa* var. *crispa*.

10. The method according to claim 1, wherein said plant is Maruba Santoh.

11. The method according to claim 1, wherein said plant is Cuiyu.

12. The method according to claim 1, wherein said plant is crinkle garden lettuce.

13. The method according to claim 1, wherein said plant is *Brassica rapa* var. *chinensis*.

14. The method according to claim 1, wherein said plant is *Lactuca sativa* var. *crispa*.

15. The method according to claim 1, wherein said hydroponic nutrient solution has an electrical conductivity of 1.8 mS/cm.

16. The method according to claim 6, wherein said hydroponic nutrient solution has an electrical conductivity of 1.2 mS/cm after said diluting step.

* * * * *